United States Patent

Adams et al.

[11] Patent Number: 5,743,012
[45] Date of Patent: Apr. 28, 1998

[54] PISTON AND PISTON RING

[75] Inventors: David Robert Adams, Rugby; Jonathan David Philby, W. Yorks, both of England

[73] Assignee: AE PLC, Warwickshire, England

[21] Appl. No.: 106,759

[22] Filed: Aug. 16, 1993

Related U.S. Application Data

[63] Continuation of Ser. No. 609,113, Nov. 2, 1990, abandoned, which is a continuation of Ser. No. 462,497, Jan. 8, 1990, abandoned, which is a continuation of Ser. No. 158,685, Feb. 22, 1988, abandoned.

[30] Foreign Application Priority Data

Feb. 24, 1987 [GB] United Kingdom .................. 8704325

[51] Int. Cl.$^6$ .................................................. B23P 15/10
[52] U.S. Cl. ..................... 29/888.043; 29/888.048; 29/888.049; 29/888.074; 277/235 A
[58] Field of Search .......................... 277/216, 224, 277/DIG. 6, 235 A, 235 R, 236; 29/527.2, 527.4, 888.07, 888.074, 888.04, 888.049, 888.043, 888.048; 92/222, 223

[56] References Cited

U.S. PATENT DOCUMENTS

| | | | |
|---|---|---|---|
| 3,936,295 | 2/1976 | Cromwell et al. | 277/235 R X |
| 4,360,956 | 11/1982 | Hiller | 29/156.5 R |
| 4,465,515 | 8/1984 | Mundorff | 29/156.5 |

FOREIGN PATENT DOCUMENTS

| | | | |
|---|---|---|---|
| 1309752 | 3/1973 | United Kingdom | 277/235 R |

*Primary Examiner*—Joseph M. Gorski
*Attorney, Agent, or Firm*—Nixon & Vanderhye P.C.

[57] ABSTRACT

A method of reducing wear between the radial faces of a piston ring and the radial faces of the co-operating piston ring groove in an aluminium alloy piston is described. The method comprises the steps of locally alloying the region in which the piston ring groove radial faces are located to increase the concentration of at least one strengthening element and coating at least the co-operating radial faces of a piston ring with a compatible material. Nickel has been found to be particularly advantageous and an example is described of a piston which is locally alloyed by electron-beam melting wherein the nickel content is raised to about 12%. The co-operating piston ring was electroless plated with a nickel-phosphorus alloy.

6 Claims, 2 Drawing Sheets

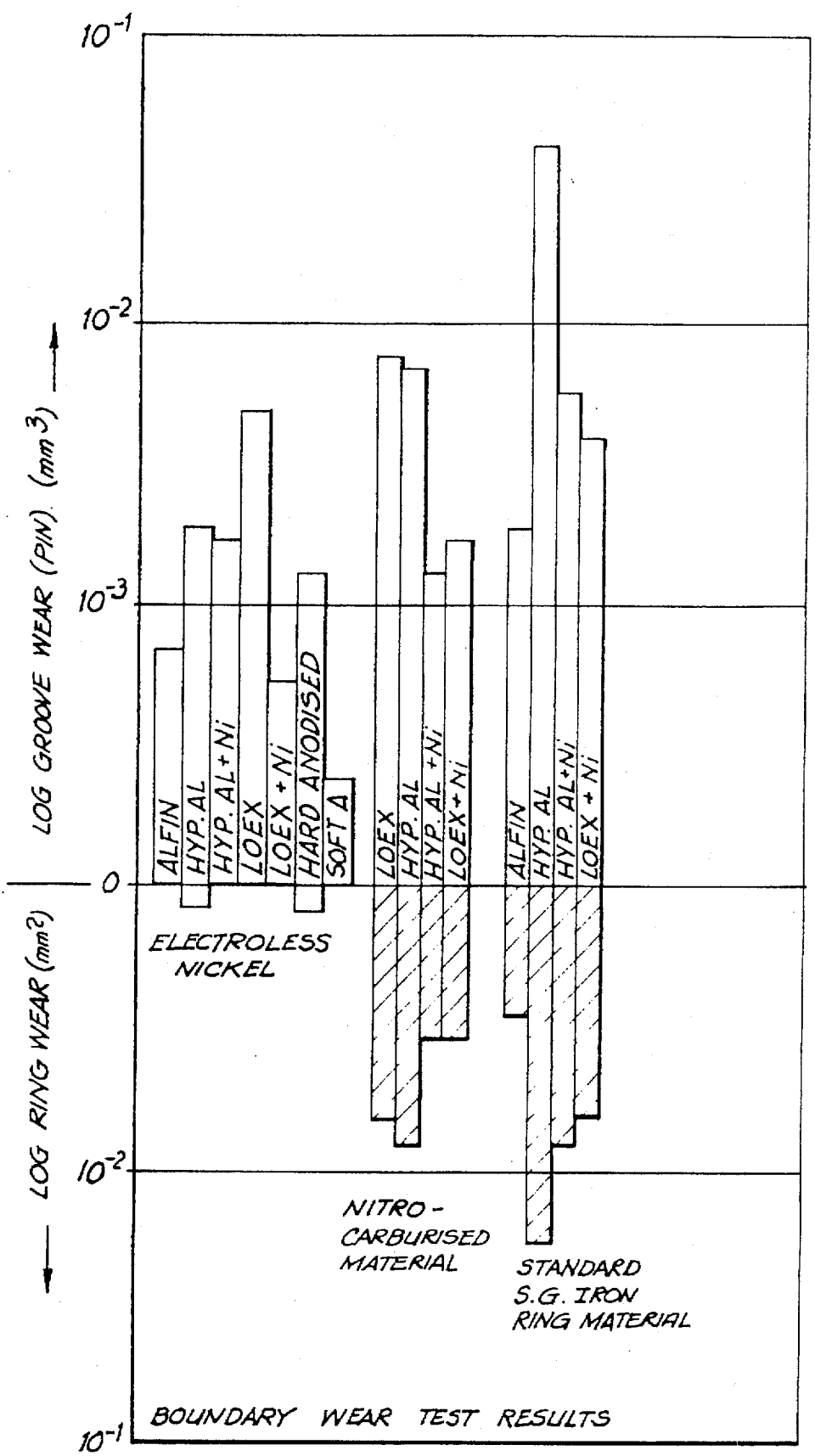

PISTON AND PISTON RING

This is a continuation of application Ser. No. 07/609,113 filed Nov. 2, 1990, now abandoned which is a continuation of Ser. No. 07/462,497 filed Jan. 8, 1990, now abandoned, which is a continuation of Ser. No. 07/158,685 filed Feb. 22, 1988, now abandoned.

The present invention relates to pistons and piston rings.

It is well-known to provide piston rings with coatings which improve the wear-resistance or compatability of the working face against an associated cylinder wall and also the wear-resistance of the piston ring faces which co-operate with the faces of the piston ring groove in the piston. Coatings such as chromium and molybdenum are frequently used on the face which rubs against the cylinder wall whilst coatings such as those produced by nitro-carburising are frequently used on the other working faces.

Similarly it is also well-known in the case of aluminium alloy pistons to include inserts cast into the piston such as, for example, Ni-resist cast iron inserts incorporated by the Alfin process. Other techniques which have been used include local alloying of the basic piston alloy to enhance wear-resistance or the incorporation of porous inserts by various pressure casting techniques. A technique for local alloying is described by Hiller in GB 2 026 649 whilst an example of the inclusion of porous inserts is described in U.S. Pat. No. 4,334,507. Other methods of enhancing piston ring-groove performance include surface treatments such as anodising.

Heretofore judged on a performance basis, the best performing technique of improving wear-resistance of the piston ring groove has been the incorporation of solid Ni-resist cast iron inserts by the Alfin technique. Unfortunately this is also the most expensive technique and adds most weight.

The surface coating techniques such as anodising give good wear-resistance for a limited period but the coating eventually wears away allowing the wear rate to rise dramatically.

The porous insert technique, whilst giving good results, is inherently expensive as it necessitates the use of a pressure casting technique such as squeeze-casting, for example.

Local alloying is economic and gives a significant improvment over the wear rate of the untreated aluminium alloy but has not proved to be as wear-resistant as an Alfin bonded insert.

It has now been discovered that unexpectedly superior wear-resistance of both the piston ring faces and the piston ring groove may be achieved by a combination of local alloying of the piston ring groove region and coating of the piston ring.

According to a first aspect of the present invention a method of reducing wear between the radial faces of a piston ring and the radial faces of the co-operating piston ring groove in an aluminium alloy piston comprises the steps of locally alloying the region in which the piston ring groove radial faces are located to increase the concentration of at least one strengthening element and coating at least the co-operating radial faces of a piston ring with a compatible material.

In one embodiment of the present invention it has been found that the local alloying step is advantageously carried out by an energy beam melting and alloying process.

Preferably an electron-beam melting process may be used as this has been found to produce substantially homogeneously alloyed material with a minimum of defects such as, for example, oxide inclusions and porosity. Other methods such as laser beam melting or TIG welding, for example, may be employed.

In one preferred embodiment the piston ring groove region may be alloyed with nickel or with an alloy having a relatively high nickel content. Nickel and nickel alloys have been found to be particularly advantageious with aluminium alloy piston materials as they readily alloy therewith to form hard, wear-resistance intermetallic compounds, are readily available in suitable forms such as wire and powder and are economic. Cobalt and cobalt alloys may alternatively be employed as similar properties are produced but, however, the cost of cobalt is significantly greater than nickel.

A nickel content in the range of 5 to 25 wt % has been found to have excellent properties. A preferred range is 8 to 20 wt % whilst the most preferred range is 10 to 17 wt %.

It has surprisingly been found that a piston ring coating also comprising a relatively high proportion of nickel has produced the best wear results when tested in combination with an aluminium alloy piston having a locally alloyed piston ring groove region containing nickel as described above.

A particularly good coating has been found to be one of nickel which also contains phosphorus. The phosphorus may be present in the range from 3 to 15 wt %. A preferred content, however, may lie in the range from 8 to 13 wt % of phosphorus.

The piston ring may be coated by any known technique such as, for example, by electro-plating, composite electro-plating (eg nickel-aumina, nickel-silicon carbide, cobalt-chromium carbide), physical vapour deposition, chemical vapour deposition. It has been found that the well-known electroless plating technique may advantageously be used. Coatings applied by this process have been found to give superior wear-resistance in conjunction with a piston locally alloyed as described above and the technique is very economic to perform.

Piston rings so coated may be heat treated as a temperature between 300° and 600° C. Preferably the heat treatment may be for more than 15 minutes and more preferably be for between 30 minutes and 2 hours.

The wear-resistance of anodised aluminium alloy piston material is very good but due to the coating being thin the life is relatively short. It is considered, however, that anodised coatings, either hard or soft, may be applied to the locally alloyed piston ring region. Thus even after the anodised coating has been penetrated there is still the wear-resistant locally alloyed material below.

There is also provided according to a second aspect of the present invention a piston and piston ring combination when made by the method of the first aspect.

In order that the present invention may be more fully understood an example will now be described by way of illustration only with reference to the accompanying drawings of which:

FIG. 3 which shows a histogram of wear test results of different material combinations.

Figure 1:
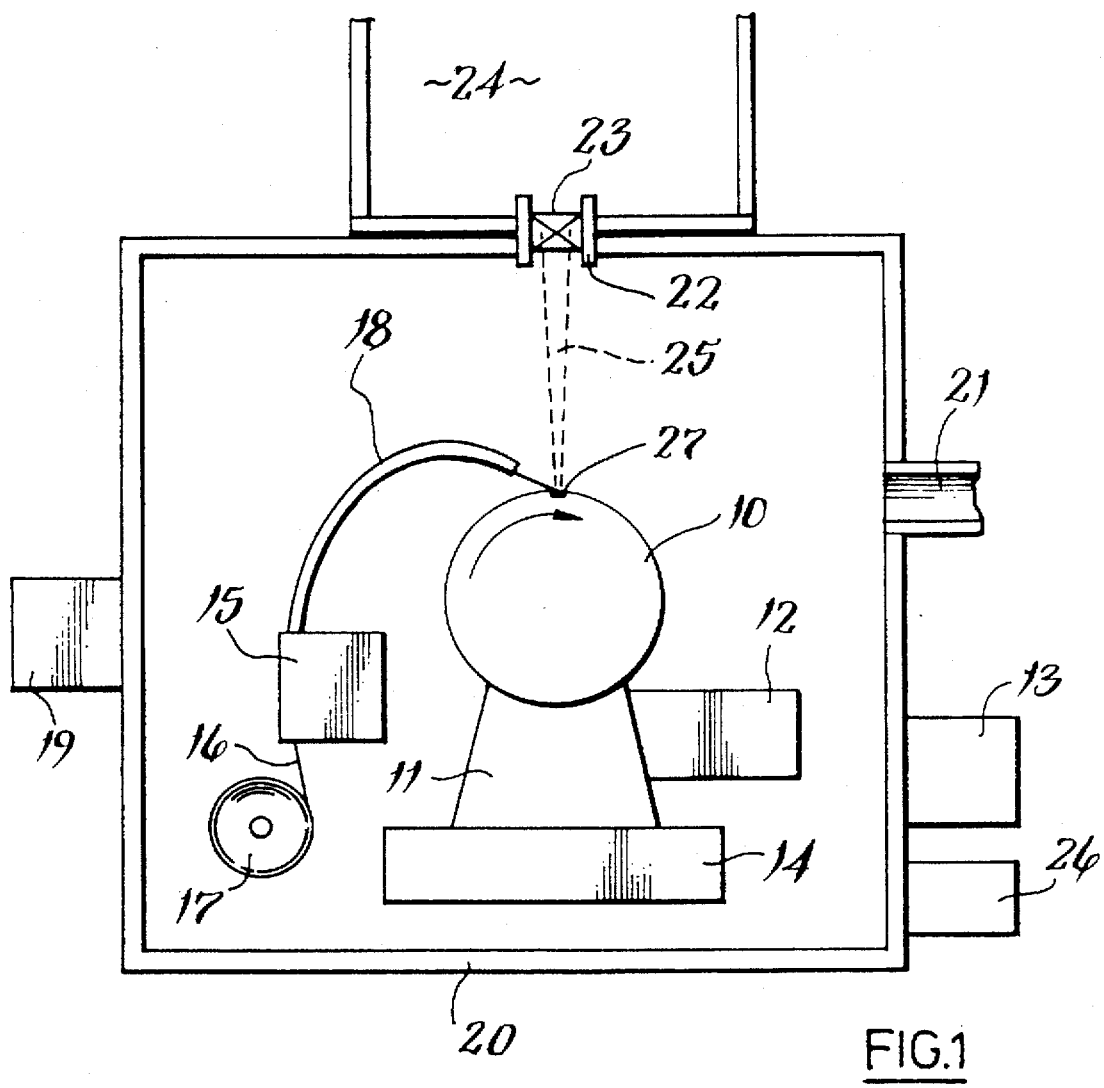
FIG. 1 shows a schematic representation of an apparatus for the local alloying of the piston ring groove region of a piston.

Referring now to FIG. 1. A piston 10 to be reinforced is mounted on a suitable support apparatus 11 with the piston axis lying in the horizontal plane. Means are provided by a motor and gearbox unit 12 to rotate the piston 10 about its axis, speed control being provided by the control unit 13.

The piston 10, support 11 and motor/gearbox unit 12 are all mounted on an X-Y table 14 having control means 26, to allow precise positioning of the piston 10. A wire-feed unit 15 feeds Nickel 61 (trade mark) wire 16 from a spool 17 via a flexible feed conduit 18 to the piston 10. The wire-feed unit 15 is controlled by a control unit 19. The piston and drive apparatus and wire-feed system are all contained within a vacuum chamber 20 having a pumping port 21 connected to a pump (not shown). In the top of the chamber 20 is a port 22 having a valve 23, the port 22 being positioned vertically above the area occupied by the piston 10. A know electron-beam welding apparatus 24 is associated with the chamber 20 via the port 22 such that when the valve 23 is displaced, an electron-beam 25 may impinge on the desired area of the piston 10.

In operation, a cast 78 mm diameter piston blank 10 of a known Lo-ex (trade mark) alloy and in the proof turned, solution treated and aged condition and having a nominal composition in wt % of:

| Cu | 1.1 | Ni | 1.5 max. | Sn | 0.1 max. |
|----|-----|----|----------|----|---------| 
| Mg | 1.2 | Mn | 0.5 max. | Ti | 0.2 max. |
| Si | 12.5 | Zn | 0.5 max. | Al | Balance |
| Fe | 1 max. | Pb | 0.1 max. | | | is mounted on the support 11. Nickel 61 wire 16 of 0.8 mm diameter and nominal composition in wt % of:

| Ni | 93 min. | Mn | 1 | Al | 1.5 |
|----|---------|----|----|----|-----|
| Co | 1.0 | Cu | 0.25 | Ti | 2–3.5 |
| Si | 0.75 | C | 0.15 | P | 0.03 |
| S | 0.01 | Fe | 1 max. | | | is fed from the spool 17 via the feed unit 15 and the conduit 18 to the point on the piston 10 where the molten metal pool 27 will be formed. The chamber 20 is pumped down to $10^{-3}$ Torr via the port 21. The valve 23 is displaced and a low power electron-beam 25 from the apparatus 24 is generated to sight the piston 10 with respect to the beam 25. Any necessary positional adjustment is made to the table 14 by the remote control means 26. The piston 10 is then rotated at 2 rev./min. and the beam power increased to 50 KV and 50 mA to produce a molten pool 27. The wire 16 is fed into the pool 27 at approximately 2 m/min. for one complete revolution, whereupon the wire feed is stopped. The electron-beam power is maintained for one further complete revolution to promote further mixing and alloying and hence homogeneity.

Figure 2:
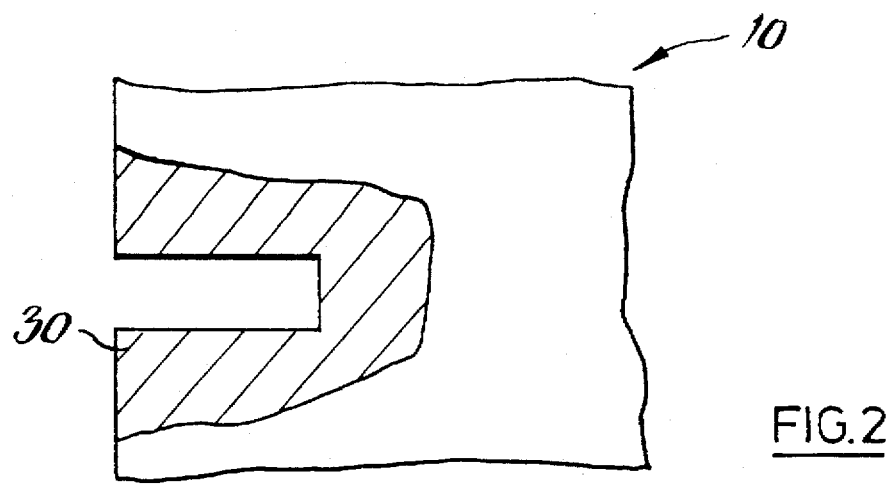
FIG. 2 shows a schematic representation of a section through the ring groove region of a locally alloyed piston.

Locally alloyed pistons produced as described typically possess as indicated in FIG. 2 a generally V-shaped section 30 of between 35 and 45 sq/mm of alloyed material. The section is substantially free of porosity and also substantially free of gross intermetallic particules or undissolved pieces of wire. The resulting structure is substantially uniform showing a distribution of fine needles of nickel aluminides.

Composition analyses on typical areas taken from around the treated periphery of a piston gave the results shown in the Table.

| Element | Area | | | |
|---|---|---|---|---|
| | 1 | 2 | 3 | 4 |
| Mg | 0.73 | 0.69 | 0.64 | 0.74 |
| Al | 71.06 | 70.35 | 71.75 | 71.14 |
| Si | 13.79 | 14.07 | 14.18 | 13.94 |
| Fe | 0.30 | 0.41 | 0.28 | 0.36 |
| Ni | 12.85 | 13.01 | 11.99 | 12.58 |
| Cu | 1.28 | 1.38 | 1.15 | 1.25 |

Hardness of the alloyed area produced in the example lies within the range 150 to 180 VPN.

Piston rings of S.G. iron material were electroless plated using the following procedure and materials.

(1) Vapour degrease (2) Electroclean—anodic alkaline cleaner 4–6V at 4–10 A/dm$^2$ 1–3 mins. at 60°–95° C.

(3) Acid dip—immerse in 20–30% hydrochloric acid-rinse (4) Ni strike—rinse (5) Electroless Ni plate (85°–95° C.) 30–60 mins.

Temperature and pH control vary composition of coating. The coating produced had a composition in wt % of Ni 91 % P 9%. Coating carried out at 90° C. pH 5.0 in Nifoss 3000 (trade mark).

The plated rings were heat treated at 400° C. for 1 hour.

The samples of the prepared materials were then tested under the conditions described below to determine the wear-resistance of the mating surfaces.

Other material combinations were also tested under the same conditions. The results of these wear tests are given in the histogram of FIG. 3.

Test conditions were:

| Pin on Flat Boundary Wear Test | |
|---|---|
| Frequency | 16.67 Hz |
| Stroke | 0.5 mm |
| Load | 6 kg |
| Temperature | 200° C. |
| Oil | Rimula × 30 (trade mark) |

The pin was 6 mm diameter having a rounded end of 25 mm radius of curvature.

The different piston groove materials were:

(1) Alfin=Ni-rest austenitic cast iron.

(2) Hyp.Al.=Hypereutectic aluminium-silicon piston alloy.

(3) Hyp.Al+Ni=As (2) plus local alloying with Ni by electron-beam melting.

(4) Lo-ex=Eutectic aluminium-silicon piston alloy.

(5) Lo-ex+Ni=As (4) plus local alloying with Ni by electron-beam melting.

(6) Hard Anodised=As (4) treated by hard anodising.

(7) Soft Anodised=As (4) treated by soft anodising.

The different piston ring materials were:

(8) Electroless Nickel=Electroless plated nickel/phosphorus as described.

(9) Nitro-carburised=Nitro-carburised S.G. iron.

(10) Standard=S.G. iron piston ring material—as commonly used in many piston ring applications.

As may be seen from FIG. 3 the combination of locally alloyed Lo-ex (5) with the electroless nickel plated ring material (8) gave wear results which were superior to all other combinations except electroless nickel against soft anodised Lo-ex (7). The latter materials, however, is only a thin coating and the life of such a coating is relatively short.

Although not locally-alloyed by a localised melting and alloying process as described above it is considered that a pressure cast piston having a porous ring groove reinforcement substituted for the locally alloyed region falls within the scope of the invention. The porous reinforcement may, for example, comprise a sintered nickel-containing stainless steel or other nickel-containing alloy body. The body may be incorporated by, for example, squeeze-casting.

Subsequent heat-treatment of the cast piston may generate wear-resistant nickel aluminide in the ring groove region which in combination with a piston ring as described above may also produce superior wear-resistance.

The technique of squeeze-casting of a particular piston may be desirable for other reasons, for example, to incorporate a ceramic fiber reinforcement in the region of the combustion bowl. The incorporation of a porous ring groove reinforcement would, therefore, in such circumstances be the most economic route.

We claim:

1. A method of reducing wear between radial side faces of a piston ring groove and cooperating radial side faces of a piston ring lying within the piston ring groove, comprising the steps of:

providing an aluminum alloy piston;

alloying a region of said piston with a strengthening material selected from the group consisting of nickel, nickel-based alloys, cobalt and cobalt-based alloys, by performing an energy beam melting procedure, thereby producing a region of alloyed material;

forming a piston ring groove within said region, wherein said piston ring groove is defined by two radial side faces interconnected by a back face such that at least the radial side faces are of said alloyed material;

providing a piston ring having two radial side faces interconnected by an outer peripheral face and an inner peripheral face;

coating the radial side faces of said piston ring with a material selected from the group consisting of a nickel-based alloy containing from 3 to 15 wt % phosphorus and a cobalt-based alloy containing from 3 to 15 wt % phosphorus; and inserting said piston ring into said piston ring groove such that the radial side faces of said piston ring are in contact with the radial side faces of said piston ring groove, respectively.

2. The method according to claim 1, further comprising heat treating said piston ring after coating.

3. The method according to claim 2 wherein said heat treating step includes heating said piston ring in a temperature range from 300° to 600° C.

4. The method according to claim 3 wherein said heat treating step further includes heating said piston ring in said temperature range for between 14 minutes and 2 hours.

5. A method of reducing wear between radial side faces of a piston ring groove and cooperating radial side faces of a piston ring lying within the piston ring groove, comprising the steps of:

providing an aluminum alloy piston;

alloying a region of said piston with a strengthening material selected from the group consisting of nickel, nickel-based alloys, cobalt and cobalt-based alloys by performing an energy beam melting procedure, thereby producing a region of alloyed material;

forming a piston ring groove within said region, wherein said piston ring groove is defined by two radial side faces interconnected by a back face such that at least the radial side faces are of said alloyed material;

providing a piston ring having two radial side faces interconnected by an outer peripheral face and an inner peripheral face;

coating the radial side faces of said piston ring with a material selected from the group consisting of a nickel-based alloy containing from 8 to 13 wt % phosphorus and a cobalt-based alloy containing from 8 to 13 wt % phosphorus; and inserting said piston ring into said piston ring groove such that the radial side faces of said piston ring are in contact with the radial side faces of said piston ring groove, respectively.

6. A method of reducing wear between radial side faces of a piston ring groove and cooperating radial side faces of a piston ring lying within the piston ring groove, comprising the steps of:

providing an aluminum alloy piston;

alloying a region of said piston with nickel by performing an energy beam melting procedure, thereby producing a region of alloyed material having a nickel content of 5 to 25 wt %;

forming a piston ring groove within said region, wherein said piston ring groove is defined by two radial side faces interconnected by a lack face such that at least the radial side faces are of said alloyed material;

providing a piston ring having two radial side faces interconnected by an outer peripheral face and an inner peripheral face;

coating the radial side faces of said piston ring with a material selected from the group consisting of a nickel-based alloy containing from 3 to 15 wt % phosphorus and a cobalt-based alloy containing from 3 to 15 wt % phosphorus; and inserting said piston ring into said piston ring groove such that the radial side faces of said piston ring are in contact with the radial side faces of said piston ring groove, respectively.

* * * * *